(12) United States Patent
Farrell

(10) Patent No.: US 12,282,498 B2
(45) Date of Patent: Apr. 22, 2025

(54) RELATIONSHIP RETRIEVAL IN A PARTITIONED LIST OF RECORDS

(71) Applicant: FAIR ISAAC CORPORATION, Roseville, MN (US)

(72) Inventor: Brent Farrell, Round Rock, TX (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 0 days.

(21) Appl. No.: 16/929,033

(22) Filed: Jul. 14, 2020

(65) Prior Publication Data

US 2020/0364246 A1 Nov. 19, 2020

Related U.S. Application Data

(63) Continuation-in-part of application No. 16/352,571, filed on Mar. 13, 2019, now Pat. No. 11,609,937.

(51) Int. Cl.
| | | |
|---|---|---|
| G06F 16/28 | (2019.01) | |
| G06F 9/54 | (2006.01) | |
| G06F 16/215 | (2019.01) | |
| G06F 16/23 | (2019.01) | |
| G06F 16/27 | (2019.01) | |
| G06F 16/901 | (2019.01) | |

(52) U.S. Cl.
CPC .......... *G06F 16/288* (2019.01); *G06F 9/546* (2013.01); *G06F 16/215* (2019.01); *G06F 16/2308* (2019.01); *G06F 16/278* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 8,583,659 B1 | 11/2013 | Alexandrescu et al. | |
| 8,793,283 B1 * | 7/2014 | Austern | G06F 16/27 |
| | | | 707/798 |

(Continued)

OTHER PUBLICATIONS

Geeksforgeeks, "Find all reachable nodes from every node present in a given set", Dec. 2016; accessible from <https://www.geeksforgeeks.org/find-all-reachable-nodes-from-every-node-present-in-a-given-set/> (Year: 2016). 10 pages.

(Continued)

*Primary Examiner* — Polina G Peach
*Assistant Examiner* — Anugeetha Kunjithapatham
(74) *Attorney, Agent, or Firm* — Mintz Levin Cohn Ferris Glovsky and Popeo, P.C.

(57) ABSTRACT

Systems and methods are provided for accessing a database of records to identify a set of records represented by one or more nodes in a graph model. A connection between a first node and a second node in the one or more nodes is monitored to determine an association between a first record, represented by the first node, and a second record, represented by the second node. The set of records may be partitioned into a plurality of groups. For at least a first group, including a first set of records, it may be determined whether two or more records in the first group are related. In response to determining that the two or more records in the first group are related, a first group identifier may be assigned to the two or more records.

20 Claims, 4 Drawing Sheets

(56) References Cited

U.S. PATENT DOCUMENTS

| | | | | |
|---|---|---|---|---|
| 8,873,867 | B1* | 10/2014 | Alldrin | G06V 30/274 707/765 |
| 9,317,805 | B1* | 4/2016 | Fraenkel | G06N 5/02 |
| 9,384,571 | B1* | 7/2016 | Covell | G06F 16/2358 |
| 10,394,789 | B1* | 8/2019 | Animesh | G06F 16/2282 |
| 10,606,892 | B1* | 3/2020 | Broecheler | G06F 16/278 |
| 2008/0281801 | A1* | 11/2008 | Larson | G06F 16/284 |
| 2009/0132561 | A1 | 5/2009 | Cormode et al. | |
| 2010/0083194 | A1* | 4/2010 | Bagherjeiran | G06F 30/18 716/132 |
| 2012/0317142 | A1* | 12/2012 | Broecheler | G06F 16/9024 707/E17.011 |
| 2012/0317579 | A1* | 12/2012 | Liu | G06F 11/1438 718/104 |
| 2013/0254193 | A1* | 9/2013 | Heidasch | G06F 16/9024 707/736 |
| 2014/0244687 | A1* | 8/2014 | Shmueli | G06F 16/28 707/780 |
| 2015/0161228 | A1* | 6/2015 | Davies | G06F 16/285 707/737 |
| 2016/0212022 | A1* | 7/2016 | Abou Mahmoud | H04L 51/216 |
| 2016/0323377 | A1* | 11/2016 | Einkauf | G06F 9/5077 |
| 2017/0053294 | A1* | 2/2017 | Yang | G06Q 20/12 |
| 2018/0081937 | A1* | 3/2018 | Broecheler | G06F 16/2453 |
| 2018/0130239 | A1* | 5/2018 | Mohr | G06T 11/206 |
| 2018/0203945 | A1* | 7/2018 | Barber | G06T 11/206 |
| 2018/0285478 | A1 | 10/2018 | Wright et al. | |
| 2018/0336457 | A1 | 11/2018 | Pal et al. | |
| 2018/0373746 | A1* | 12/2018 | Chen | G06F 16/278 |
| 2019/0251480 | A1 | 8/2019 | Garcia Duran et al. | |
| 2019/0266528 | A1 | 8/2019 | Cheng et al. | |
| 2020/0153934 | A1 | 5/2020 | Burbank et al. | |

OTHER PUBLICATIONS

Liu et al., "Discovering communities in complex networks by edge label propagation", Mar. 2016 (Year: 2016). 10 pages.

Xie et al., "Label Rank: A Stabilized Label Propagation Algorithm for Community Detection in Networks," Mar. 2013 (Year: 2013). 6 Pages.

Ghrab et. al., "GRAD: On Graph Database Modeling", download from <https://www.researchgate.net/publication/301857276 GRAD On Graph Database Modeling>, Feb. 2016 (Year: 2016). 29 pages.

Ghrab et. al., "GRAD: On Graph Database Modeling", downloaded from <https://www.researchgate.net/publication/301857276 GRAD On Graph Database Modeling>, Feb. 2016 (Year: 2016). 29 pages.

* cited by examiner

RELATIONSHIP RETRIEVAL IN A PARTITIONED LIST OF RECORDS

CROSS-REFERENCE TO RELATED APPLICATIONS

The present application claims priority to U.S. patent application Ser. No. 16/352,571, filed on Mar. 13, 2019, the content of which is incorporated herein by reference in entirety. To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

TECHNICAL FIELD

The disclosed subject matter generally relates to resolving associations between entities and, more particularly, to efficiently identifying and retrieving relationships in a partitioned list of records by way of computer-implemented systems and methods.

BACKGROUND

In computer-implemented self-learning classification systems, identity resolution is a core feature for determining identities and relationships between various individuals and entities. These relationships may be monitored or tracked using computing technologies and for the purpose of identifying fraudulent activity, determining consumer behavior, or for other analytic purposes.

Some classification technologies utilize a relationship graph that has a plurality of nodes that reflect the identities and relationships between data records stored in a database. The records and the associated data included in the relationship graph, typically, represent individuals, entities, or other items and the respective relationships and connections between them. Parsing the nodes in a relationship graph helps determine connections and relationships between the various items, records, or nodes in the graph.

Currently implemented identity resolution technologies utilize a parsing process for the relationship graph that is very time consuming and costly, especially when a large number of nodes are included in the relationship graph. Methods and systems are needed that can help improve the efficiency of the current identity resolution systems and computer-implemented learning models and related technologies that use relationship graphs.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for accessing a database of records to identify a set of records represented by one or more nodes in a graph model are provided. In accordance with certain implementations, a connection between a first node and a second node may represent an association between a first record represented by the first node and a second record represented by the second node. The set of records may be partitioned into a plurality of groups.

For a first group, a first set of records is examined to determine whether two or more records in the first group are related. In response to determining that the two or more records in the first group are related, a first group identifier is assigned to the two or more records. For at least a second group, including a second set of records, it may be determined whether two or more records in the second group are related. In response to determining that the two or more records in the second group are related, a second group identifier may be assigned to the two or more records. The determining of whether two or more records are related may be based on information included in the graph model.

In some implementations, the first group identifier may uniquely identify the first set of records, and the second group identifier may uniquely identify the second set of records. Determining whether two or more records in the first group or the second group are related may be based on concurrently accessing relationship information included in the graph model. The first set of records in the first group are written to a first input queue and the second set of records in the second group are written to a second input queue distinct from the first input queue, in accordance with one or more embodiments.

In one example scenario, the records in the first input queue are stored in a first output queue and the records in the second input queue are stored in a second output queue, such that all records in the first output queue and the second output queue are associated with a respective group identifier. In certain configurations, the records in the first output queue and the second output queue are merged. The merged records may be then deduplicated according to their respective group identifiers.

Depending on implementation, a record in the second output queue may not be merged with the first output queue, if the record in the second output queue already exists in the first output queue, as determined based on the respective group identifiers. In accordance with some aspects, the relationship between two records may be based on matching a group identifier associated with the record in the second output queue against a hashmap that tracks records previously processed for the purpose of avoiding inclusion of duplicate records.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
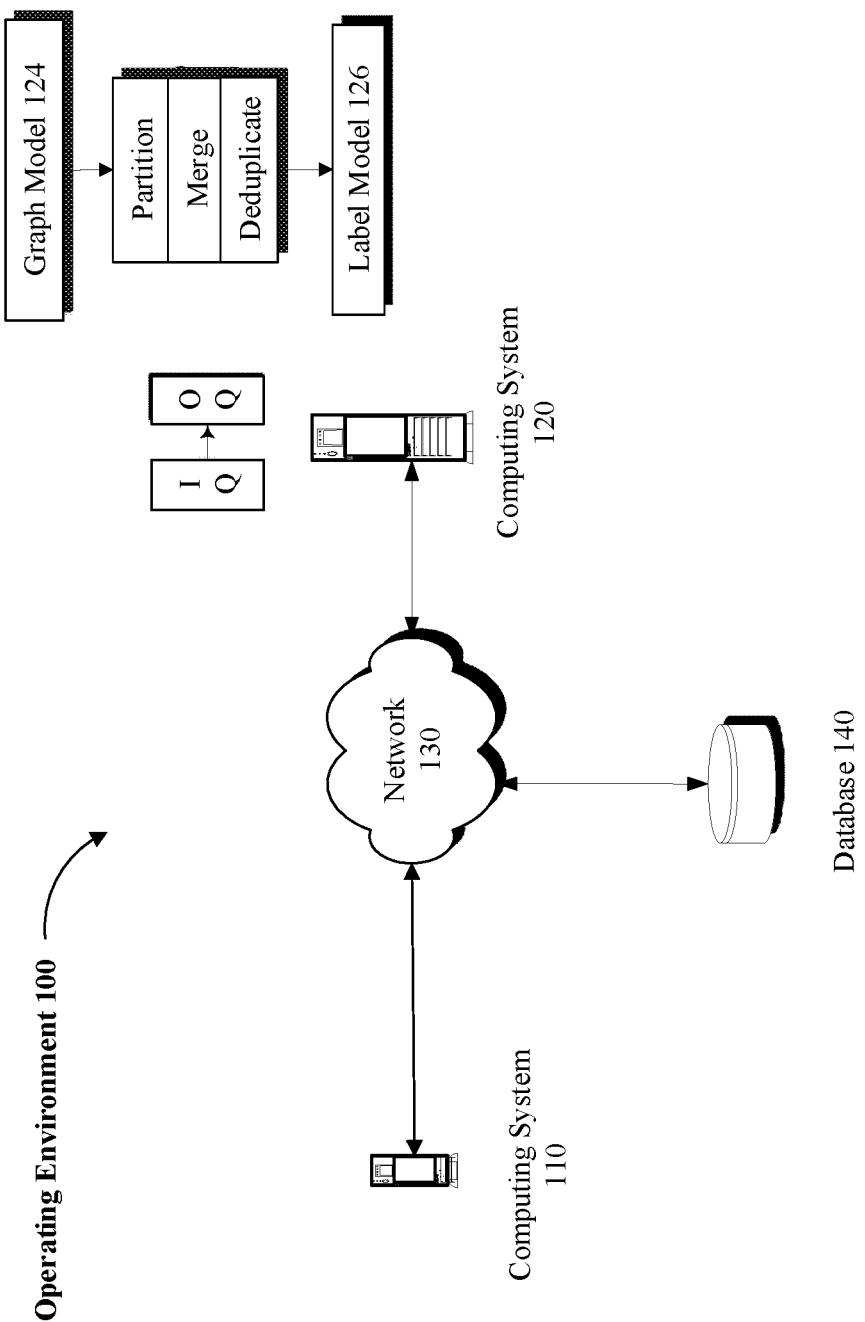
FIG. 1 illustrates an example operating environment, in accordance with one or more embodiments, wherein a graph model and a label model may be implemented for the purpose of determining associations among various records in a database.

Referring to FIG. 1, an example operating environment 100 is illustrated in which a list of related entities may be determined based on information stored in a database 140. Database 140 may include information about a plurality of entities and the relationships between said entities. As shown, computing system 110 may be a general-purpose computer, a handheld mobile device (e.g., a smart phone), a tablet or other communication capable computing device. Software such as a web browser, a dedicated app or other type of software application may be running either fully or partially on computing system 110 to enable or activate certain features disclosed herein.

Computing system 110 may, for example, communicate over a network 130 to access data stored in database 140 or to access services provided by a computing system 120. Depending on implementation, database 140 may be local to, remote to, or embedded in one or more of computing systems 110 or 120. Data structures and data models, such as graph model 124 or label model 126, may be configured on or manipulated by computing systems 110 or 120 to service one or more requests. A request may be submitted by computing system 110 (e.g., a client system) via network 130 and managed by computing system 120 utilizing data structures, such as data queues, arrays or linked lists. Network 130 may be implemented over a local or wide area network (e.g., the Internet).

In example embodiments, computing systems 110 and 120 may be implemented over a centralized or distributed (e.g., cloud-based) computing environment as dedicated resources or may be configured as virtual machines that define shared processing or storage resources. Execution of software (i.e., logic code) and implementation or instantiation of objects that access or manipulate data or records stored in database 140, graph model 124 or label model 126 may define a special purpose machine that provides remotely situated client systems, such as computing system 110, with access to a variety of data and services as provided by computing system 120.

In accordance with one or more implementations, the services provided by computing system 120 or other special purpose machines, including software executed thereon, may include providing a user or another computing system with information about one or more entities (e.g., persons, applicants, identifiable individuals, etc.), where information about such entities is stored, managed or tracked in database 140 having a plurality of records.

In certain embodiments, database 140 may be implemented to store information and include records about entities and entity relationships defined by a graph model 124. Graph model 124 may be a relationship graph that includes a plurality of nodes. A node may include information about an entity and records and references to secondary entities or records. The nodes may be connected by way of one or more edges that signify one or more associations or relationships between the nodes.

A node may have multiple pointers to other nodes, indicating multiple relationships between a first entity, represented by a first node, and other entities, represented by the other respective nodes in the graph model. When it is desirable to generate a list of entities that are related to the first entity, in a non-optimal system, an iterative search may be performed across the nodes in graph model 124. Such iterative search starts from a first node, representing the first entity, parsing the paths connecting the secondary nodes and the children of the secondary nodes.

Unless a more efficient solution is available, the iterative parsing will likely need to be exhaustive through the entire graph model 124. This is because each branch or path connecting the first node to all the related nodes will have to be parsed in order to determine all the nodal relationships in the relationship graph. Such exhaustive search is unfortunately inefficient and time consuming, due to the number of routes and nodes in each route that are to be examined and parsed.

To illustrated based on a simple example, if a node A is connected to nodes A1, A2, A3 and each node A1, A2, A3 has three children of its own (A11, A12, A13, A21, A22, A23, A31, A32, A33), then 12 paths ($3^1+3^2$) in the graph are to be parsed to determine all the entities and relationships. At the next level, assuming that each node continues to have three children, 39 paths ($3^1+3^2+3^3$) would have to be parsed. As the number of levels n and the number of children x (i.e., signifying the number and depth of relationships between the nodes) in the graph grows, the number of paths parsed to create a list of related entities is exponentially increased by a magnitude of nx.

Performing an exhaustive parsing of the nodes in a graph model 124 would require a substantial level of resources and is time consuming as the number of branches and the depth of relationships increases in graph model 124. To reduce the parsing order, in certain embodiments, entries in graph model 124 may be optimized by implementing a corresponding label model 126, which may be searched in a linear order (e.g., order of n or order of x) instead of an exponential order (i.e., order of nx). Such implementation would provide improvements both in parsing efficiency and resource management.

Referring back to FIG. 1, and as provided in further detail herein, to avoid the inefficiencies associated with having to perform an iterative search, the records included in graph model 124 may be partitioned into a plurality of groups and stored in one or more input queues, so that a queue includes a portion of all records in database 140. For example, if database 140 includes 100 records, choosing to partition the records into groups of 25 records, would require the implementation or instantiation of four input queues that can store at least 25 records. Because each queue may be processed in parallel, the throughput of the system is increased by a factor of four, in the above example.

More specifically and as provided in further detail below, a record in an input queue (IQ) may be processed to find other related records. The processed record and the related records may be identified as related and placed onto an output queue (OQ). In the above example, four input queues when processed can yield results to be stored in, for example, four output queues (not shown in FIG. 1). The input to an input queue may include information about individual records and the relationship of the individual record to other records.

In certain embodiments, the results stored in a corresponding output queue may include a list of records that are identified (i.e., labeled with a group identifier) as being associated to a common group. The lists from multiple output queues may be then merged and deduplicated to create label model 126. Advantageously, label model 126 can be linearly searched to determine relationships between two or more records. This linear search approach substantially improves the speed by which the records may be processed, as compared to iteratively searching through the graph model 124.

Label model 126 may be implemented by way of partitioning the list of entities stored in graph model 124 and grouping the entities that are related to each other, for example, by way of associating a unique label to the related entities. Once label model 126 is constructed, a list of entities that are related to an entity X, for example, may be generated by searching for entity X in label model 126, finding a first label L1 associated with the entity X and searching for one or more or all other entities in the database that are labeled with L1.

The data structure for managing the entity searching or parsing may be implemented in the form of a data look-up table and an equivalently functional data structure. As illustrated in the example table below, under a first column, target entities may be listed, and under a second column, the corresponding labels for the entities may be listed. Entries in graph model 124 may be managed and updated as new entities are added, using the label model 126. As such, searching the entries in graph model 124 may be optimized by converting the graph model 124 into a label model 126 that includes the same entities and relationships but is faster to search.

In one example scenario, a list of records may be provided in an input stream. Graph model 124 may be accessed to determine how the records in the input stream are related to each other. For example, an input stream may include a list of records [A, B, C, F, I, J, K, O]. Graph model 124 may indicate A is related to B and C; F is related to G; and I is related to J, K, and O, for example.

| Record | Is Related To |
| --- | --- |
| A | B, C |
| B | A, C |
| C | A, B |
| F | G |
| I | J, K, O |
| J | I, K, O |
| K | I, J, O |
| O | I, J, K, O |

Figure 2A:
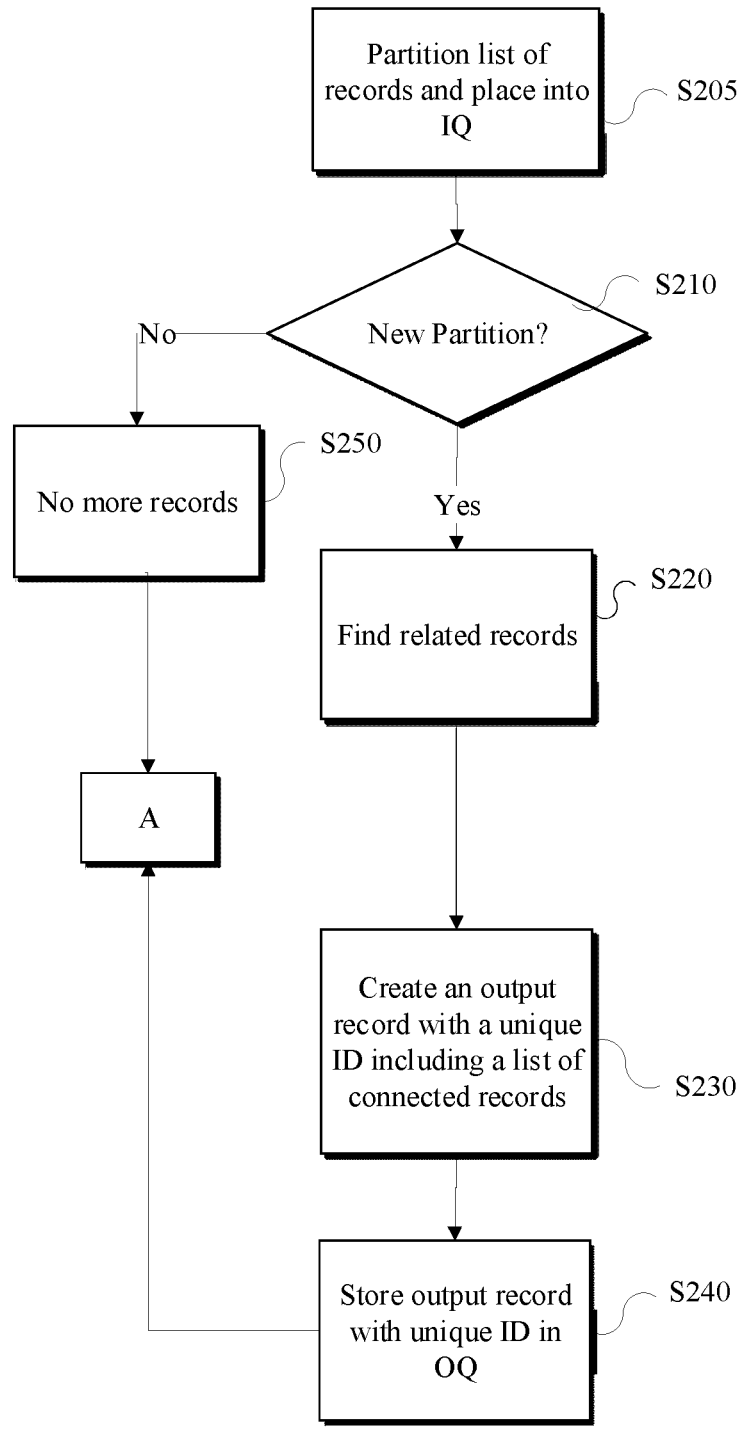
FIGS. 2A and 2B are example flow diagrams for determining associations among various records in an efficient manner by way of concurrent processing of records partitioned and stored in multiple groups, in accordance with certain embodiments.

Referring to FIG. 2A, the records in the input list may be grouped into separate partitions and, in one aspect, the distinct groups may be stored separately in distinct input queues, (S205). Depending on implementation, the partition size may be either arbitrarily selected, or may be a function of the number of records in the input list. In the above example scenario, if the partition size is chosen to be three, then the grouping may be into five input queues as provided below:

| |
| --- |
| A, B, C |
| D, E, F |
| G, H, I |
| J, K, L |
| N, O |

The relationships between the records in a common queue may be determined by examining graph model 124. Advantageously, because the input queues are independent from one another, the graph model 124 may be accessed using concurrently running lookup processes (i.e., parallel lookups). In a worst-case scenario, the number of concurrent lookups to graph model 124 will be equal to the number of partitions. It can be seen, however, that the parallel processing of the entities in the five queues, in the above example, increases the efficiency of the system by a factor of five.

As shown in FIG. 2A, in one implementation, the records in a partition are retrieved from a corresponding input queue. When a new partition is retrieved (S210), the related records in the partition are determined (S220). As noted earlier, the related records may be determined based on the connection information provided in graph mode 124. To reflect the connection information in the output stream, an output record may be created, having a group ID for the group of related records and including a list of connected records (S230).

In the example scenario provided earlier, the partitioning and the grouping results may be illustrated as follows:

Partition 1

| Record | Group ID |
| --- | --- |
| A | A |
| B | A |
| C | A |

Partition 2

| Record | Group ID |
|---|---|
| D | D |
| E | E |
| F | F |

Partition 3

| Record | Group ID |
|---|---|
| G | F |
| H | H |
| I | I |

Partition 4

| Record | Group ID |
|---|---|
| J | I |
| K | I |
| L | L |
| O | I |
| I | I |

Partition 5

| Record | Group ID |
|---|---|
| N | N |
| O | I |
| J | I |
| K | I |

The results of the partitioning and grouping, based on a unique group ID, may be stored in one or more output queues, where related records in a group are assigned a common ID and the records in different groups are stored in a separate output queue (S240). The above process for partitioning and grouping records in each partition may continue until it is determined that no more records are left for processing in the input queues (S250). In one aspect, a flag or an end of record indicator may be stored in the output queue to indicate that all records in the input queues have been processed and grouped.

The grouped records in the output queues may be processed, preferably concurrently, in order to merge the output of each processed partition together into a single list. For example, the output queue for a partition may be monitored and examined so that the related records from the partition are placed into a new output list. If a group of related records exists in more than one partition, the records may become duplicated across different partitions. Accordingly, a deduplication process may be applied so that the duplicate records are removed.

Figure 2B:
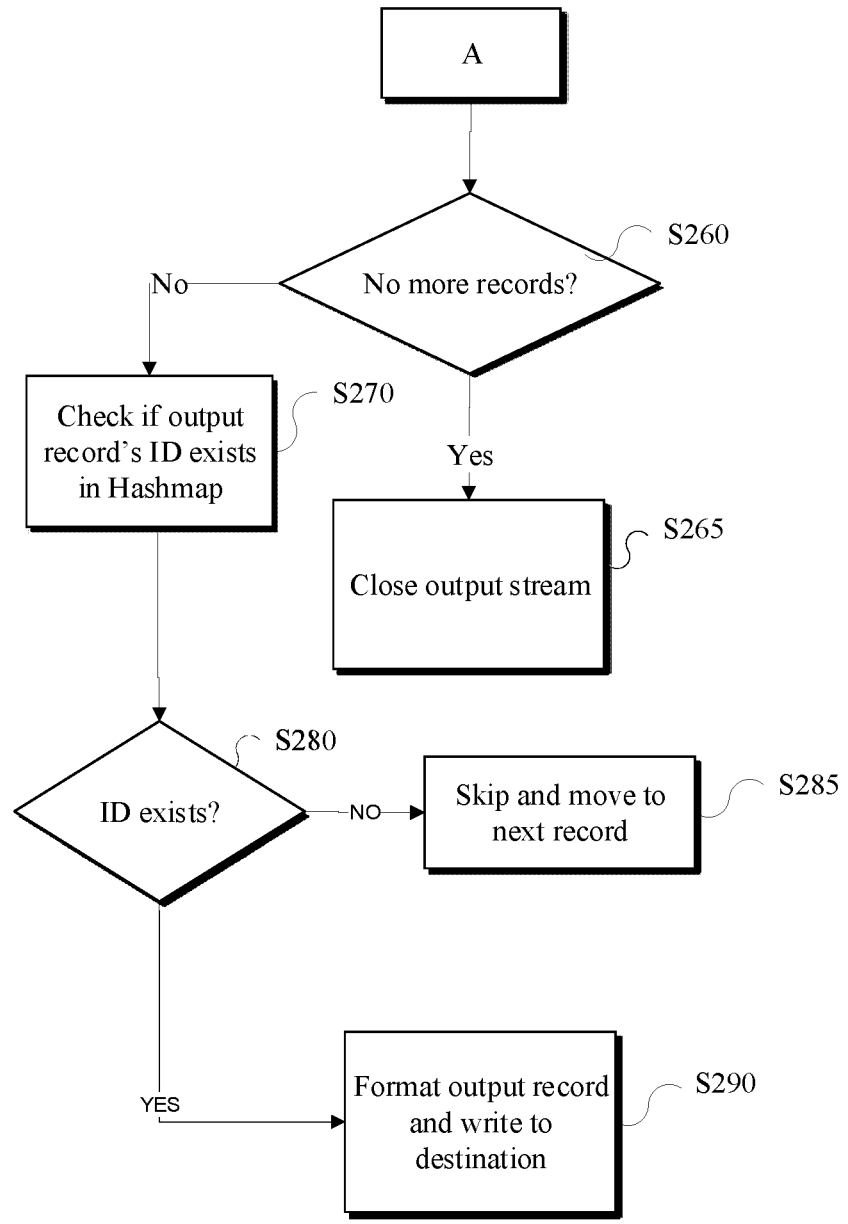

Referring to FIG. 2B, in one implementation, when it is determined that no more records and partitions are left for processing (S260), then the output stream is closed (S265). Otherwise, for a record in an output queue, it is determined if the record's group ID exists in a hashmap of group IDs for records that have been already processed (S270). If the ID does not exist (S280), then the next record is processed (S285). Otherwise, the output record is formatted and is written to a destination (S290). The formatting may be in CVS, JSON or other type of proprietary format and the records may be written to a destination file, a web browser or other type of analysis tool, depending on implementation.

Accordingly, the above process overcomes the need for serially processing an input list of records. Instead, a number of parallel retrievals are scheduled, for example, according to a number of scheduled batches. If a relationship store (e.g., a database) in which graph model 124 is implemented is overwhelmed by the number of parallel lookups, a feedback loop may be established to provide an alert and reduce the number of partitions. To deduplicate the output stream, an atomic operation may be implemented to check the shared data structure and emit a record from a partition by way of a shared lock between the partitions to cause the partitions to periodically stop and wait to acquire the lock.

Figure 3:
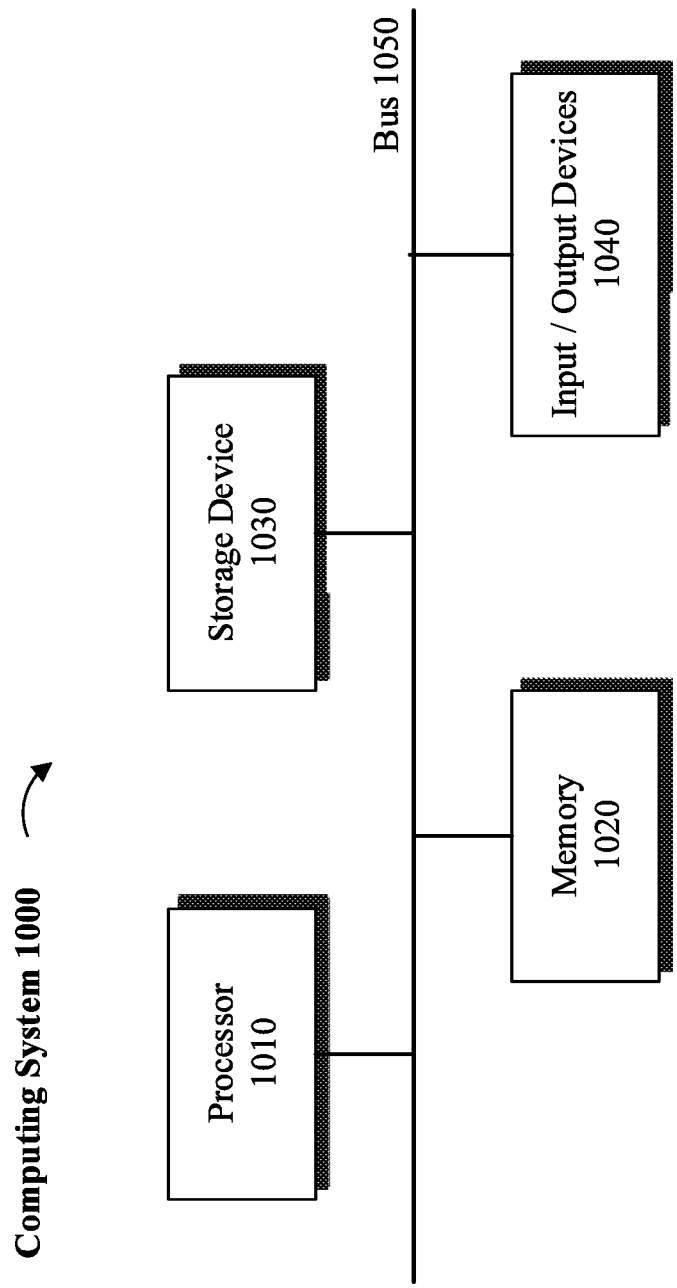
FIG. 3 is a block diagram of a computing system that may be utilized to perform one or more computing processes disclosed herein as consistent with one or more disclosed features.

Referring to FIG. 3, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

The computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material which is subject to copyright protection. The owner has no objection to facsimile reproduction by any one of the patent documents or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for determining associations between a plurality of records, the method comprising:
   accessing a database of records, the database including a plurality of records represented by a plurality of nodes in a graph model, a connection between a first node and a second node in the graph model representing an association between a first record represented by the first node and a second record represented by the second node, the connection being implemented based on at least one pointer pointing from the first node to the second node in the graph model;
   partitioning the plurality of records into a plurality of groups by storing the records in one or more input queues such that a first set of records are stored in a first input queue and a second set of records are stored in a second input queue, the records in the first input queue and second input queue being accessible in parallel to identify related records, wherein the partitioning of the plurality of records is based on a computational processing capacity of a relationship store in which the graph model is implemented;
   for at least a first group in the plurality of groups, including the first set of records, determining two or more records in the first group are related, in response to determining that the two or more records in the first group are connected via one or more pointers identified in the graph model, assigning a first group identifier to the related two or more records in the first group;
   for at least a second group in the plurality of groups, including the second set of records, determining two or more records in the second group are related, in response to determining that the two or more records in the second group are related connected via one or more pointers identified in the graph model, assigning a second group identifier to the related two or more records in the second group,
   storing a first list of records assigned to the first group identifier in a first output queue;
   storing a second list of records assigned to the second group identifier in a second output queue; and
   merging the first list of records and the second list of records based on the first group identifier and the second group identifier to generate a linearly searchable label model to determine one or more relationships between records in the plurality of records without serially traversing the plurality of connections between the plurality of nodes in the graph model.

2. The method of claim 1, wherein the plurality of records are included in an input stream and the partitioning is based on the number of the records in the input stream.

3. The method of claim 2, wherein the first group identifier uniquely identifies the first set of records, and the second group identifier uniquely identifies the second set of records, such that a search of the plurality of records in the label model is performed based on a linear search order instead of an exponential search order required for the graph model.

4. The method of claim 1, wherein the determining whether two or more records in the first group are related and the determining whether two or more records in the second group are related is based on concurrently accessing relationship information included in the graph model.

5. The method of claim 4, wherein the first set of records in the first group are written to a first input queue and the second set of records in the second group are written to a second input queue distinct from the first input queue.

6. The method of claim 5, wherein the records in the first input queue are stored in a first output queue and the records in the second input queue are stored in a second output queue, such that all records in the first output queue and the second output queue are associated with a respective first or second group identifier.

7. The method of claim 6, wherein the records in the first output queue and the second output queue are merged.

8. The method of claim 7, wherein the merged records are deduplicated according to their respective group identifiers.

9. The method of claim 7, wherein a record in the second output queue is not merged with the first output queue, in response to determining that the record in the second output queue already exists in the first output queue based on assigned group identifiers.

10. The method of claim 9, wherein the determining is based on matching a group identifier associated with the record in the second output queue against a hashmap that tracks records previously processed for the purpose of avoiding inclusion of duplicate records.

11. A computer-implemented system comprising:
    at least one programmable processor; and
    a non-transitory machine-readable medium storing instructions that, when executed by the at least one programmable processor, cause the at least one programmable processor to perform operations comprising:
    accessing a database of records, the database including a plurality of records represented by a plurality of nodes in a graph model, a connection between a first node and a second node in the graph model representing an association between a first record represented by the first node and a second record represented by the second node, the connection being implemented based on at least one pointer pointing from the first node to the second node in the graph model;
    partitioning the plurality of records into a plurality of groups by storing the records in one or more input queues such that a first set of records are stored in a first input queue and a second set of records are stored in a second input queue, the records in the first input queue and second input queue being accessible in parallel to identify related records, wherein the partitioning of the plurality of records is based on a computational processing capacity of a relationship store in which the graph model is implemented;
    for at least a first group in the plurality of groups, including the first set of records, determining two or more records in the first group are related, in response to determining that the two or more records in the first group are connected via one or more pointers identified in the graph model, assigning a first group identifier to the related two or more records in the first group;
    for at least a second group in the plurality of groups, including the second set of records, determining two or more records in the second group are related, in response to determining that the two or more records in the second group are related connected via one or more pointers identified in the graph model, assigning a second group identifier to the related two or more records in the second group,
    storing a first list of records assigned to the first group identifier in a first output queue;
    storing a second list of records assigned to the second group identifier in a second output queue; and merging the first list of records and the second list of records based on the first group identifier and the second group identifier to generate a linearly searchable label model to determine one or more relationships between records in the plurality of records without serially traversing the plurality of connections between the plurality of nodes in the graph model.

12. The system of claim 11, wherein plurality of records are included in an input stream and the partitioning is based on the number of the records in the input stream.

13. The system of claim 12, wherein the first group identifier uniquely identifies the first set of records, and the second group identifier uniquely identifies the second set of records, such that a search of the plurality of records in the label model is performed based on a linear search order instead of an exponential search order required for the graph model.

14. The system of claim 11, wherein the determining whether two or more records in the first group are related and the determining whether two or more records in the second group are related is based on concurrently accessing relationship information included in the graph model.

15. The system of claim 14, wherein the first set of records in the first group are written to a first input queue and the second set of records in the second group are written to a second input queue distinct from the first input queue.

16. A computer program product comprising a non-transitory machine-readable medium storing instructions that, when executed by at least one programmable processor, cause the at least one programmable processor to perform operations comprising:
   accessing a database of records, the database including a plurality of records represented by a plurality of nodes in a graph model, a connection between a first node and a second node in the graph model representing an association between a first record represented by the first node and a second record represented by the second node, the connection being implemented based on at least one pointer pointing from the first node to the second node in the graph model;
   partitioning the plurality of records into a plurality of groups by storing the records in one or more input queues such that a first set of records are stored in a first input queue and a second set of records are stored in a second input queue, the records in the first input queue and second input queue being accessible in parallel to identify related records, wherein the partitioning of the plurality of records is based on a computational processing capacity of a relationship store in which the graph model is implemented;
   for at least a first group in the plurality of groups, including the first set of records, determining two or more records in the first group are related, in response to determining that the two or more records in the first group are connected via one or more pointers identified in the graph model, assigning a first group identifier to the related two or more records in the first group;
   for at least a second group in the plurality of groups, including the second set of records, determining two or more records in the second group are related, in response to determining that the two or more records in the second group are related connected via one or more pointers identified in the graph model, assigning a second group identifier to the related two or more records in the second group,
   storing a first list of records assigned to the first group identifier in a first output queue;
   storing a second list of records assigned to the second group identifier in a second output queue; and
   merging the first list of records and the second list of records based on the first group identifier and the second group identifier to generate a linearly searchable label model to determine one or more relationships between records in the plurality of records without serially traversing the plurality of connections between the plurality of nodes in the graph model.

17. The computer program product of claim 16, wherein plurality of records are included in an input stream and the partitioning is based on the number of the records in the input stream.

18. The computer program product of claim 17, wherein the first group identifier uniquely identifies the first set of records, and the second group identifier uniquely identifies the second set of records, such that a search of the plurality of records in the label model is performed based on a linear search order instead of an exponential search order required for the graph model.

19. The computer program product of claim 16, wherein the determining whether two or more records in the first group are related and the determining whether two or more records in the second group are related is based on concurrently accessing relationship information included in the graph model.

20. The computer program product of claim 19, wherein the first set of records in the first group are written to a first input queue and the second set of records in the second group are written to a second input queue distinct from the first input queue.

* * * * *